A. W. RICHARDS.
HAY RAKE.
APPLICATION FILED FEB. 24, 1910.
974,827.
Patented Nov. 8, 1910.
2 SHEETS—SHEET 2.
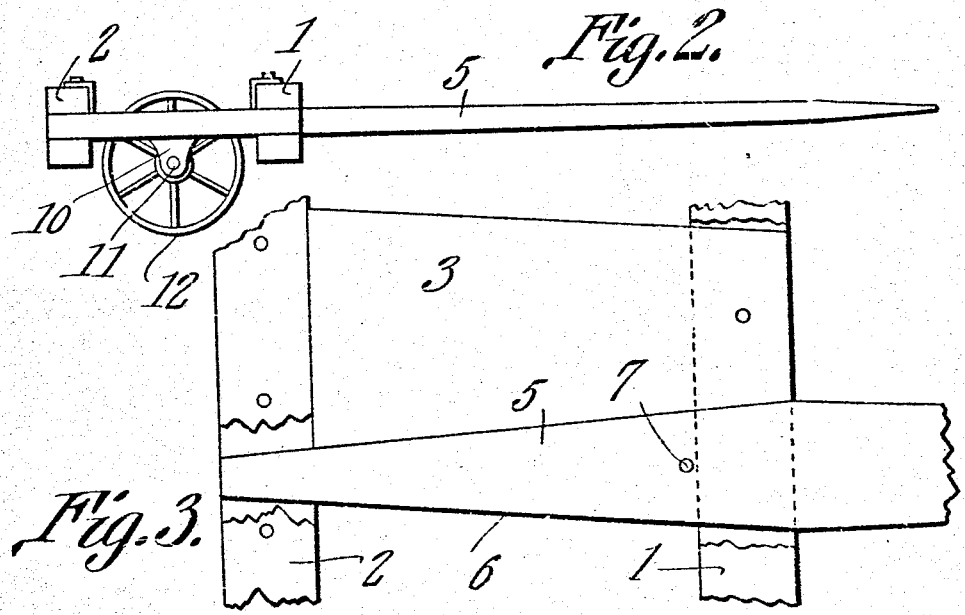
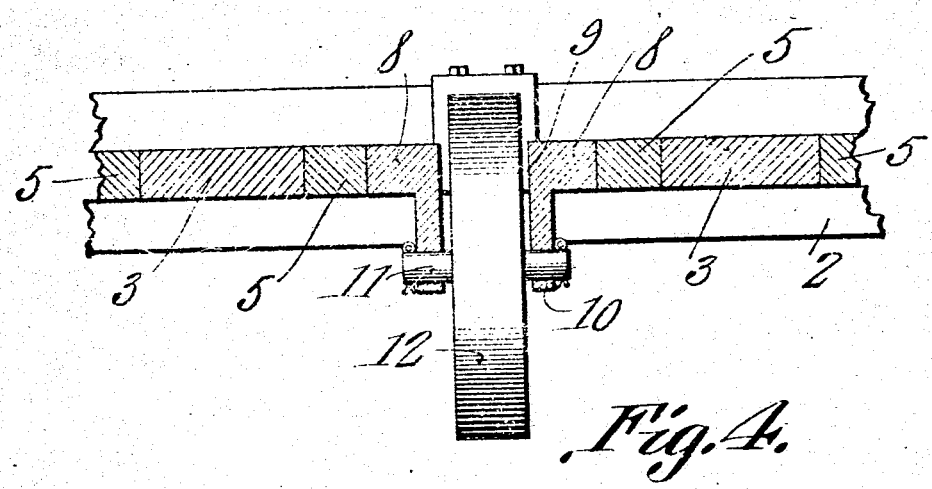
Albert W. Richards, Inventor

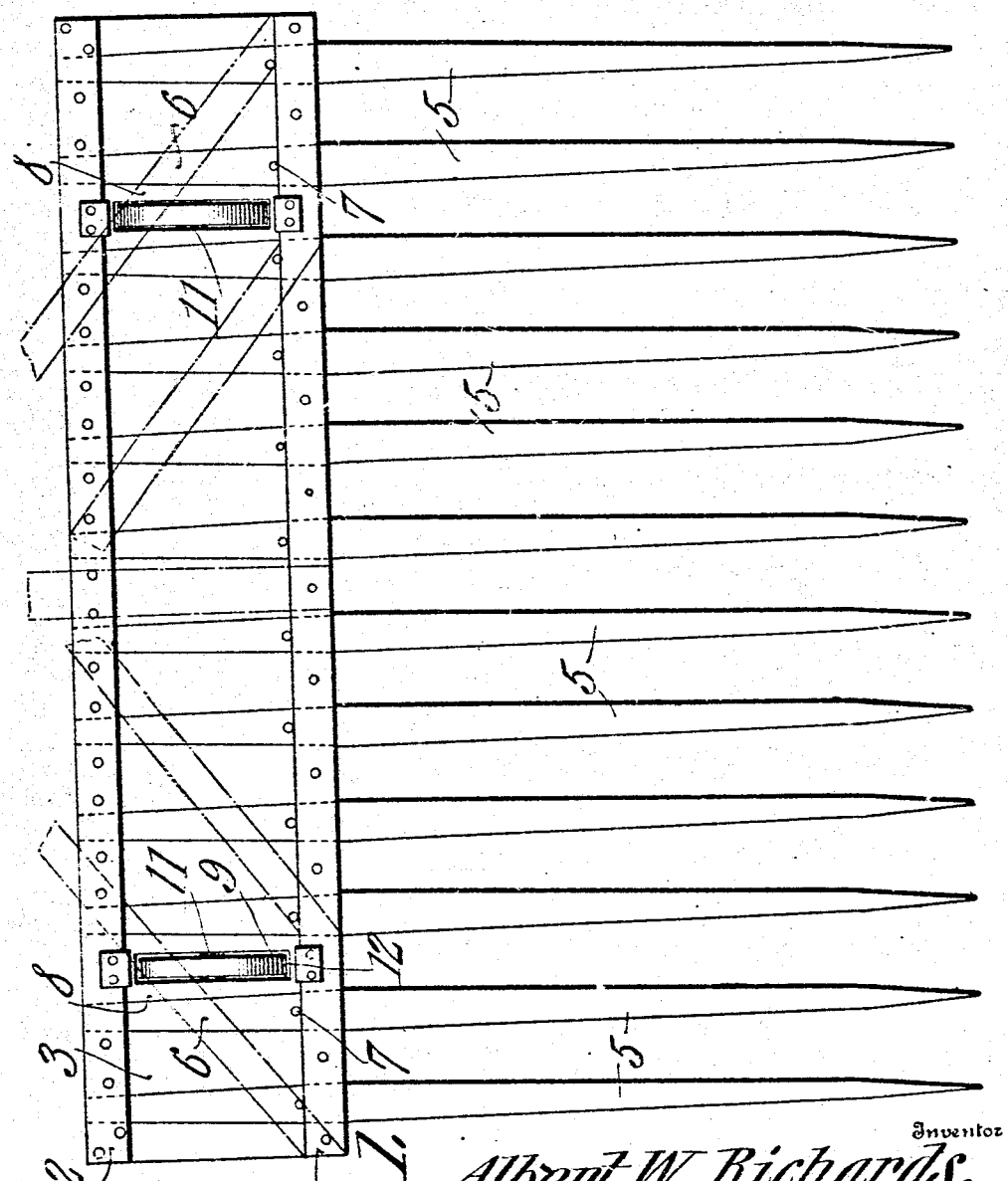

UNITED STATES PATENT OFFICE.

ALBERT W. RICHARDS, OF SHERIDAN, WYOMING.

HAY-RAKE.

974,827.  Specification of Letters Patent.  Patented Nov. 8, 1910.

Application filed February 24, 1910. Serial No. 545,715.

*To all whom it may concern:*

Be it known that I, ALBERT W. RICHARDS, a citizen of the United States, residing at Sheridan, in the county of Sheridan and State of Wyoming, have invented a new and useful Hay-Rake, of which the following is a specification.

This invention has relation to hay rakes and it consists in the novel construction and arrangement of its parts as hereinafter shown and described.

The object of the invention is to provide a hay rake structure of that character generally known as a sweep or push rake and the prime object of the present invention is to provide means for easily and readily removing a broken tine therefrom in order that a new tine may be readily inserted in its stead.

As such rakes are constructed at the present time it is a difficult and tedious matter to replace a broken tine and as said tines are subjected to constant and various strains they frequently break and therefore it is necessary to lose much time during the harvesting of a hay crop or pass the implement over the field without its full complement of tines and thus reduce its effectiveness.

With the above objects in view, the structure of the rake includes a frame made up of parallel front and rear bars connected together by blocks which are inserted at their forward and rear ends between the parallel forward and parallel rear bars respectively, and which are provided with vertical sides or edges which converge toward each other at the forward ends of the blocks. The tines are inserted between the parallel forward and rear bars and between the converging edges of the blocks and the side edges of the tines converge toward their rear ends so that they tilt slightly against the converging edges of the blocks and effect a solid structure. Keys are provided for preventing the tines from working in a forward direction after they have been inserted between the said bars and blocks. Some of the blocks carry supporting wheels and differ slightly in structure from the blocks above described, as will be hereinafter explained.

In the accompanying drawings,—Figure 1 is a top plan view of the rake. Fig. 2 is a vertical side elevation of the same. Fig. 3 is a detail plan view of a portion of the rake. Fig. 4 is a detail sectional view of a portion of the rake.

The rake structure includes the parallel front bars 1 and the parallel rear bars 2. Blocks 3 are inserted at their forward ends between the parallel front bars 1 and at their rear ends between the parallel rear bars 2. The vertical side edges of the blocks 3 converge toward each other from the rear ends of the blocks toward their forward ends. Tines 5 are inserted at their portions between the parallel front bars 1 and between the parallel rear bars 2 and the vertical side edges of the rear portions of the said tines converge toward each other from points intermediate of the tines toward their rear ends as at 6 and the said rear portions of the tines having the converging side edges fit snugly against the side edges of the blocks 3. Keys or locking devices 7 are attached to tines 5 and bear against the rear edges of the front bars 1 and are adapted to prevent the tines from working forwardly after they have been inserted between the blocks in the manner indicated.

After the rear portions of the tines have been inserted in between the vertical side edges of the blocks 3 in the manner indicated, the said tines are held in position against the work that they perform in gathering the hay by the resulting wedging action occurring between the converging side edges of the blocks and the converging side edges of the rear portions of the said tines. Therefore when a tine is broken it is necessary only to remove the keys or securing devices 7 and by tapping upon the rear end of the tine in a forward direction the rear end portion of the tine is driven from between the adjacent blocks 3 and a new tine may be inserted between the said blocks and secured as indicated. Thus it will be seen that much time will be saved in replacing a broken tine. The blocks 8 are of slightly different configuration and structure than those designated at 3. The said blocks 8 also have converging side edges but are provided with openings 9 which have at their opposite sides depending bearings 10. Axles 11 are journaled in the bearings 10 and ground wheels 12 are mounted upon the said axles. Thus means is provided for supporting the rake structure.

Any desired or approved means may be used for propelling the rake structure over the surface of the ground and the said structure may be employed as a sweep or push rake as desired.

Having described the invention what I claim as new and desire to secure by Letters Patent is:—

1. A rake structure comprising parallel front bars, parallel rear bars, blocks secured at their forward ends between the parallel front bars, and at their rear ends between the parallel rear bars, said blocks having their side edges converging from their rear ends toward their forward ends, and tines adapted to fit snugly at their rear portions between the parallel front bars and the parallel rear bars and at their vertical edges against the sides of the adjacent blocks.

2. A rake structure including parallel front bars, parallel rear bars, blocks having their forward ends located between the parallel front bars and their rear ends located between the parallel rear bars, said blocks having their side edges converging from their rear ends toward their forward ends, tines fitting at their rear portions snugly between the parallel front bars and the parallel rear bars and having side edges which fit snugly against the side edges of said blocks, and keys attached to the tines and adapted to engage the bars to prevent the said tines from working forwardly.

3. A rake structure comprising parallel front bars, parallel rear bars, blocks secured at their forward ends between the parallel front bars and at their rear ends between the parallel rear bars and having their side edges converging toward each other from their rear ends toward their forward ends, tines fitting snugly between the parallel front bars and parallel rear bars and having side edges fitting snugly against the converging side edges of the adjacent blocks, some of said blocks being provided with openings having depending bearings located at their opposite sides and at points between their ends, axles journaled in said bearings and supporting wheels mounted upon the axles and projecting through the openings in the said blocks.

In testimony that I claim the foregoing as my own, I have hereto affixed my signature in the presence of two witnesses.

ALBERT W. RICHARDS.

Witnesses:
  A. C. BECKWITH,
  U. T. RUTHERFORD.